3,535,326
Patented Oct. 20, 1970

3,535,326
CERTAIN TETRAHYDRO CARBOLINE DERIVATIVES
Hisao Yamamoto, Nishinomiya-shi, Yasushi Nakamura, Hirakata-shi, Masaru Nakao, Osaka, Toshio Atsumi, Takarazuka-shi, and Tsuyoshi Kobayashi, Minoo-shi, Japan, assignors to Sumitomo Chemical Company, Ltd., Osaka, Japan, a corporation of Japan
No Drawing. Filed Mar. 6, 1967, Ser. No. 620,625
Int. Cl. C07d *31/44*
U.S. Cl. 260—295         5 Claims

ABSTRACT OF THE DISCLOSURE

Indole derivatives represented by the formula,

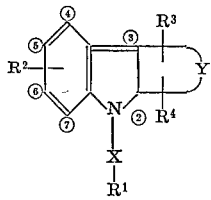

wherein $R^1$ is a non-substituted or lower alkyl- having 1 to 3 carbons, alkoxy- having 1 to 3 carbons, alkylthio- having 1 to 3 carbons or halogen-substituted aromatic ring, a non-substituted or halogen- or alkyl- having 1 to 3 carbons substituted 5- or 6-membered heterocyclic ring containing a nitrogen, oxygen or sulfur, or a non-substituted or halogen-, phenyl-, phenoxy- or alkoxy- having 1 to 2 carbons substituted alkyl having 1 to 10 carbons or alkenyl having 1 to 10 carbons; $R^2$ is a lower alkyl having 1 to 3 carbons, alkoxy having 1 to 3 carbons, alkylthio having 1 to 3 carbons, halogen or hydrogen; $R^3$ and $R^4$ are hydrogen or halogen or hydroxycarbonyl, alkoxycarbonyl (the alkoxy having 1 to 3 carbons), alkyl having 1 to 3 carbons, alkenyl having 1 to 3 carbons or alkoxy having 1 to 3 carbons; X is carbonyl or sulfonyl; and

is a 5- or 6-membered ring or a nitrogen-containing 5- or 6-membered heterocyclic ring, which are useful as anti-flammatory drug.

This invention relates to novel indole derivatives and a process for preparing the same. More particularly, the invention pertains to novel indole derivatives represented by the general formula:

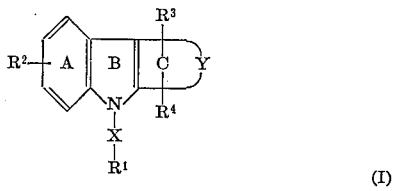

wherein $R^1$ is a non-substituted or lower alkyl- having 1 to 3 carbons, alkoxy- having 1 to 3 carbons, alkylthio- having 1 to 3 carbons or halogen-substituted aromatic ring, a non-substituted or halogen- or alkyl- having 1 to 3 carbons substituted 5- or 6-membered heterocyclic ring containing a nitrogen, oxygen or sulfur, or a non-substituted or halogen-, phenyl-, phenoxy- or alkoxy- having 1 to 2 carbons substituted alkyl having 1 to 10 carbons or alkenyl having 1 to 10 carbons; $R^2$ is a lower alkyl having 1 to 3 carbons, alkoxy having 1 to 3 carbons, alkylthio having 1 to 3 carbons, halogen or hydrogen; $R^3$ and $R^4$ are hydrogen or halogen or hydroxycarbonyl, alkoxycarbonyl (the alkoxy having 1 to 3 carbons), alkyl having 1 to 3 carbons, alkenyl having 1 to 3 carbons or alkoxy having 1 to 3 carbons; X is carbonyl or sulfonyl; and

is a 5- or 6-membered ring or a nitrogen-containing 5- or 6-membered heterocyclic ring, and a process for preparing the same.

The novel indole derivatives represented by the general Formula I are obtained in high yields by reacting at an elevated temperature a hydrazine derivative, or a salt thereof, represented by the general formula:

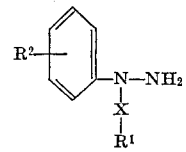

wherein $R^1$, $R^2$ and X are the same as in the case of the general Formula I, with a compound represented by the general formula:

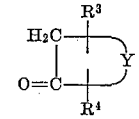

wherein $R^3$, $R^4$ and

are the same as in the case of the general Formula I.

The above reaction progresses smoothly even in the absence of solvent, but the use of suitable solvents is preferable. As the solvents, there are used organic acids such as acetic, formic, propionic, lactic and butyric acids, non-polar organic solvents such as cyclohexane, n-hexane, benzene and toluene, and general organic solvents such as dioxane and dimethylformamide and, in some cases, alcohols such as methyl, ethyl and i-propyl alcohols.

The reaction progresses at a temperature within the range of 40°–200° C., but a temperature range of 60°–100° C. is most preferable. The use of condensing agents is not always necessary but there are used inorganic acids such as hydrochloric, sulfuric and phosphoric acids, heavy metal halides such as zinc chloride and copper chloride, boron fluorides, polyphosphoric acids and cation exchange resins.

The process of the present invention is quite novel, and not only the reaction is entirely unknown but also the hydrazine derivatives and salts thereof, which are the starting materials to be used, are novel compounds not disclosed in the literature.

The synthesis of N-acyl-indole compounds has heretofore been effected according to a method in which an indole compound is first synthesized and is then subjected to acylation. In the above synthesis method, there have frequently been adopted such complex and disadvantageous procedures that a metal salt of indole is initially prepared by use of NaH, NaNH$_2$, etc. and is then reacted with an acyl halide.

In accordance with the present process, the product is obtained in extremely high yields, and the after-treatments thereof are markedly simple as compared with the conventional method. That is, in most cases, the desired product is directly obtained as a precipitate after completion of the reaction. Even in the case where no precipitate is formed, the reaction liquid is concentrated or is added to a suitable liquid such as, for example, water or acetic acid water, whereby the desired product is obtained in the form of beautiful crystals.

Depending on the kind of starting materials, there are some cases where two isomers are obtained as products, as shown by, for example, the following reaction equation:

All the N-acyl-indole derivatives obtained in accordance with the present process are not only novel compounds but are useful compounds having prominent antiphlogistic, analgesic, antifebric and calmative actions.

According to the present process, compounds of the substituents enumerated below are obtained in high yields, in general.

$R^1$—X—: acetyl, chloroacetyl, propionyl, isobutyroyl, 4'-chlorocrotonyl, n-pentanoyl, n-hexanoyl, 2,4-hexadienoyl, n-decanoyl, n-octanoyl, n-heptanoyl, cinnamoyl, cinnamylacryoyl, acryoyl, benzoyl, p-chlorobenzoyl, p-methylbenzoyl, p-methoxybenzoyl, p-methylthiobenzoyl, m,p-dimethoxybenzoyl, p-bromobenzoyl, benzenesulfonyl, p-toluenesulfonyl, α-naphthoyl, β-naphthoyl, nicotinoyl, isonicotonoyl, 2-chloroisonicotinoyl, 2-furoyl, 3-furoyl, 2-thenoyl, 3 - thenoyl, 5-chloro-2-thenoyl, N-methyl-hexahydronicotinoyl, phenylacetyl, phexoxyacetyl, phenoxyacryloyl, 2 - phenylcinnamoyl, p - chlorocinnamoyl, p-methoxycinnamoyl, 3-methoxypropionyl and 4-methoxycrotonoyl groups.

$R^2$—: methyl, ethyl, isopropyl, methoxy, ethoxy, methylthio, ethylthio, chloro, bromo and hydrogen groups.

$R^3$ and $R^4$: hydrogen, hydroxycarbonyl, methoxycarbonyl, ethoxycarbonyl, methyl, ethyl, methylene, ethylidene, methoxy, ethoxy, chloro and bromo groups.

Y-containing ring C: pyrrolidine, piperidine, cyclohexene and cyclopentene rings.

In accordance with the present process, the following compounds were easily obtained in high yields:
6-methoxy-9-(p-chlorobenzoyl)-1,2,3,4-tetrahydrocarbazole.
1-(p-methylbenzoyl)-5-methyl-2,3-cyclopenteno-indole.
1-(p-methoxybenzoyl)-5-methylthio-2,3-cyclopenteno-indole.
1-(p-chlorobenzoyl)-5-chloro-2,3-(1'-methoxycarbonylcyclopenteno)-indole.
1-(p-chlorobenzoyl)-5-chloro-2,3-(2'-methoxycarbonylcyclopenteno)-indole.
3-methyl-6-methoxy-9-(p-chlorobenzoyl)-1,2,3,4-tetrahydrocarbazole.
3-methyl-6-methoxy-9-(p-methylthiobenzoyl)-1,2,3,4-tetrahydrocarbazole.
3-methyl-6-methoxy-9-(2',4'-hexadienoyl)-1,2,3,4-tetrahydrocarbazole.
6-methoxy-9-chloroacetyl-1,2,3,4-tetrahydrocarbazole.
3-methyl-6-methoxy-9-nicotinoyl-1,2,3,4-tetrahydrocarbazole.
3-methyl-6-methoxy-9-(5'-chloro-2'-thenoyl)-1,2,3,4-tetrahydrocarbazole.
3-methyl-6-methoxy-9-(2'-furoyl)-1,2,3,4-tetrahydrocarbazole.
3-methyl-6-methoxy-9-(N'-methyl hexahydro-nicotinoyl)-1,2,3,4-tetrahydrocarbazole.
3-methyl-6-methoxy-9-(p-chlorobenzoyl)-1,2,3,4-tetrahydro-γ-carboline.
2-methyl-6-methoxy-9-(p-chlorobenzoyl)-1,2,3,4-tetrahydro-β-carboline.
3,5-dimethyl-9-(p-chlorobenzoyl)-1,2,3,4-tetrahydrocarbazole.
3,7-dimethyl-9-(p-chlorobenzoyl)-1,2,3,4-tetrahydrocarbazole.
4-methyl-5-methoxy-9-(p-chlorobenzoyl)-1,2,3,4-tetrahydrocarbazole.
4-methyl-7-methoxy-9-(p-chlorobenzoyl)-1,2,3,4-tetrahydrocarbazole.
3-methyl-6-methylthio-9-(N'-methylhexahydronicotinoyl)-1,2,3,4-tetrahydrocarbazole.

As mentioned before, these compounds contain compounds having prominent antiphlogistic and the like actions and are extremely useful in practice.

For example, the present inventors have obtained the following test results:

| Compound | Effectiveness | | |
|---|---|---|---|
| | $ID_{50}$* (per os, mg./kg.) | $LD_{50}$† (per os, mg./kg.) | Therapeutic ratio, $LD_{50}/ID_{50}$ |
| 3-methyl-6-methoxy-9-(p-chlorobenzoyl)-1,2,3,4-tetrahydrocarbazole | 250 | >1,500 | >6 |
| 2-methyl-6-methoxy-9-(p-chlorobenzoyl)-1,2,3,4-tetrahydrocarbazole | 250 | >1,500 | >6 |
| 1-(p-chlorobenzoyl)-5-methoxy-2,3-(1'-methoxycarbonylcyclopenteno)-indole | 135 | >1,500 | >11 |
| 3-methyl-6-methoxy-9-(p-chlorobenzoyl)-tetrahydro-γ-carboline hydrochloride | 150 | >1,500 | >10 |
| Phenylbutazone | 145 | 680 | 4.7 |

*50% inhibition dose of carageenin hind paw endema of rat.
†50% lethal dose of mouse in 1 week.

The following examples illustrate the present process, but the examples are merely illustrative and it is not intended to limit the invention only to these examples.

EXAMPLE 1

7.5 g. of $N_1$-(p-chlorobenzoyl)-p-methoxyphenylhydrazine hydrochloride was added to 15 ml. of cyclohexanone, and the mixture was heated at 90° C. for 5 minutes. After allowing the mixture to cool, the produced precipitate was filtered, and the filtrate was charged with 80 ml. of a 40% aqueous acetic acid solution to give a large amount of crystals. The crystals were filtrated and dried to give 8.1 g. of crude crystals of 6-methoxy-9-(p-chlorobenzoyl)-1,2,3,4-tetrahydrocarbazole, M.P. 94°–97° C. The crude crystals were recrystallized from a solution of 420 ml. of ethanol and 200 ml. of water to obtain 7.1 g. of a pure product, M.P. 104°–105° C.

EXAMPLE 2

7 g. of $N_1$-(p-chlorobenzoyl)-p-methoxyphenylhydrazine hydrochloride, 10 ml. of 4-methylcyclohexanone and 26 ml. of cyclohexane were heated with stirring at 80° C. for 15 minutes. Thereafter, the precipitate was filtered and washed with 5 ml. of cyclohexane. The collected filtrate was concentrated to about half volume and was then charged with 120 ml. of a 50% aqueous acetic acid solution to give a large amount of solids. After cooling the reaction liquid with ice, the solids were filtered, washed with 20 ml. of cold water and dried to give 7.7 g. of pale yellow crude crystals of 3-methyl-6-methoxy-9-(p-chlorobenzoyl)-1,2,3,4-tetrahydrocarbazole. The crude crystals were recrystallized from 400 ml. of ethanol to give 6.9 g. of a pure product, M.P. 142°–143° C.

EXAMPLE 3

A mixture comprising 30 g. of $N_1$-(p-chlorobenzoyl)-p-methoxyphenyl-hydrazine hydrochloride, 15.5 g. of 3-methylcyclohexanone and 100 ml. of cyclohexanone was heated with stirring at 70°°–76° C. for one hour.

When cooled, the whole mixture solidified. The solidified mixture was then recrystallized from alcohol-water to obtain 32 g. of a mixture of 2-methyl-6-methoxy-9-(p-chlorobenzoyl)-1,2,3,4-tetrahydrocarbazole and 4-methyl-6-methoxy-9-(p-chlorobenzoyl) - 1,2,3,4 - tetrahydrocarbazole. The melting point of the mixture was 121°–124° C.

EXAMPLE 4

5 g. of $N_1$-(p-chlorobenzoyl)-p-methoxyphenylhydrazine hydrochloride and 2.1 g. of 3-oxo-cyclopentanecarboxylic acid were added to 40 ml. of cyclohexane, and the mixture was reacted at an elevated temperature. After completion of the reaction, the produced precipitate was filtrated and was purified to give a mixture of 1-(p-chlorobenzoyl) - 5 - methoxy - 2,3 - (1'-hydroxycarbonyl-cyclopenteno)-indole and 1-(p-chlorobenzoyl)-5-methoxyl-2,3-(2'-hydroxycarbonyl-cyclopenteno) - indole, M.P. 79°–82° C.

EXAMPLE 5

7.0 g. of $N_1$-nicotinoyl-p-methoxyphenyl-hydrazine hydrochloride, 10 ml. of 4-methyl-cyclohexanone and 26 ml. of cyclohexane were stirred at 80° C. for 1 hour, whereby a large amount of ochre crystals were precipitated. After allowing the mixture to cool, the precipitate was filtered, washed with a small quantity of a solution mixture of acetic acid and water and dried to give 8.0 g. of 3-methyl - 6 - methoxy-9-nicotinoyl-1,2,3,4-tetrahydrocarbazole hydrochloride, M.P. 165.5°–168° C.

EXAMPLE 6

6.3 g. of $N_1$-(p-chlorobenzoyl)-p-methoxyphenylhydrazine hydrochloride, and 3.4 g. of 1-methyl-4-piperidone hydrochloride were added to 25 ml. of ethanol, and the mixture was heated at 70°–75° C. for one hour under nitrogen gas. The produced crystals were filtered, washed with water, and dried to give 4.3 g. of 3 - methyl-6-methoxy - 9 - (p-chlorobenzoyl)-1,2,3,4-tetrahydro-γ-carboline hydrochloride monohydrate, M.P. 216°– 218° C. The recrystallization from a solution mixture of ethanol and water give a pure crystals, M.P. 223°–225° C.

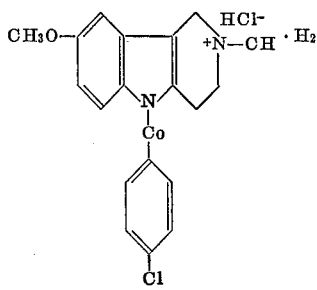

EXAMPLE 7

19 g. of $N_1$-acetylphenylhydrazine hydrochloride, and 10 g. of cyclohexanone were added to 30 ml. of acetic acid, and the mixture was stirred at 70°–80° C. for five hours. Produced crystals were filtered off, and the filtrate was concentrated to syrup. A small amount of ethanol were added to the syrup and left at room temperature, and produced crystals were filtered to give 9-acetyl-1,2,3,4 - tetrahydrocarbazole. The recrystallization from ethanol gave pure 9 - acetyl-1,2,3,4-tetrahydrocarbazole, M.P. 77°–78.5° C.

EXAMPLE 8

7.5 g. of $N_1$-benzoylphenylhydrazine hydrochloride and 10 g. of cyclohexanone were added to 20 ml. of acetic acid. The mixture was stirred at 80° C. for two hours. Produced crystals were filtered off and the filtrate was concentrated to syrup. A small quantity of ethanol was added to the syrup and allowed to stand at room temperature. Produced crystals were filtered to give 6.9 g. of 9 - benzoyl-1,2,3,4-tetrahydrocarbazole. Recrystallized from ethanol gave pure crystals, M.P. 83.5°–84.5° C.

What is claimed is:

1. A 1,2,3,4-tetrahydro-carboline derivative having the following structure

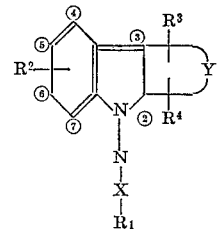

wherein $R_1$ is a non-substituted or $C_1$–$C_3$ alkyl-, $C_1$–$C_3$ alkoxy-, $C_1$–$C_3$ alkylthio-, or halogen-substituted phenyl or naphthyl; a non-substituted or halogen- or $C_1$–$C_3$ alkyl-substituted pyridyl, furyl, or thienyl; a phenyl-, phenoxy- or $C_1$–$C_2$ alkoxy-substituted $C_1$–$C_{10}$ alkyl or $C_2$–$C_5$ alkenyl;

$R^2$ is $C_1$–$C_3$ alkyl, $C_1$–$C_3$ alkoxy, $C_1$–$C_3$ alkylthio, halogen or hydrogen;

$R^3$ and $R^4$ are hydrogen or halogen or hydroxycarbonyl, alkoxycarbonyl wherein said alkoxy is $C_1$–$C_3$, $C_1$–$C_3$ alkyl, $C_1$–$C_3$ alkenyl or $C_1$–$C_3$ alkoxy;

X is carbonyl; and

is β, γ or Δ tetrahydropyridyl ring.

2. The carboline derivative according to claim 1 wherein $R^1$ is a halogen-substituted phenyl and X is carbonyl.

3. The carboline derivative according to claim 1 wherein $R^2$ is $C_1$–$C_3$ alkoxy, $R^3$ is $C_1$–$C_3$ alkyl and $R^4$ is hydrogen.

4. The carboline derivative of claim 1 which is 3-methyl-6-methoxy - 9 - (p-chlorobenzoyl)-1,2,3,4 tetrahydro-γ-carboline.

5. The carboline derivative of claim 1 which is 2-methyl-6-methoxy - 9 - (p-chlorobenzoyl)-1,2,3,4-tetrahydro-γ-carboline.

References Cited

UNITED STATES PATENTS 2,759,943    8/1956    Horlein ------------ 260—296

ALAN L. ROTMAN, Primary Examiner

U.S. Cl. X.R.

260—240, 293.4, 294.8, 295.5, 315, 326.3, 326.5, 326.9; 424—266, 267, 274

UNITED STATES PATENT OFFICE
CERTIFICATE OF CORRECTION

Patent No. 3,535,326                    Dated October 20, 1970

Inventor(s) Hisao YAMAMOTO et al

It is certified that error appears in the above-identified patent and that said Letters Patent are hereby corrected as shown below:

The above-identified patent failed to show Convention Priority as follows:

JAPAN, Application No. 16640/66, filed March 16, 1966
JAPAN, Application No. 2056/67, filed January 10, 1967

SIGNED AND
SEALED
MAR 2 1971

(SEAL)
Attest:

Edward M. Fletcher, Jr.
Attesting Officer

WILLIAM E. SCHUYLER, JR.
Commissioner of Patents

FORM PO-1050 (10-69)